United States Patent [19]
Lazes

[11] Patent Number: 5,667,337
[45] Date of Patent: Sep. 16, 1997

[54] ROTATING CONTAINMENT AND REPELLING BOOM AND METHOD FOR CONFINING A MATERIAL FLOATABLE ON A LIQUID SURFACE

[76] Inventor: Richard J. Lazes, 804 First Ave., Harvey, La. 70058

[21] Appl. No.: 529,010

[22] Filed: Sep. 15, 1995

[51] Int. Cl.⁶ .............................. E02B 15/04; B01D 43/00
[52] U.S. Cl. .......................... 405/63; 210/242.3; 210/923
[58] Field of Search ........................... 405/63; 210/242.3, 210/923

[56] References Cited

U.S. PATENT DOCUMENTS

| | | | |
|---|---|---|---|
| 4,432,874 | 2/1984 | Lundin | 210/242.4 |
| 5,346,329 | 9/1994 | Goans et al. | 405/68 |
| 5,374,133 | 12/1994 | Lazes et al. | 405/68 |

*Primary Examiner*—Tamara L. Graysay
*Assistant Examiner*—Tara L. Mayo
*Attorney, Agent, or Firm*—George A. Bode; Michael L. Hoelter

[57] ABSTRACT

A non-contact floating containment or repelling device used to gather, contain or repel a material such as oil that has been spilled on the surface of a body of water. This device consists of a plurality of paddlewheels serially connected along a shaft secured between distant vessels. This shaft is rotated, thereby rotating the paddlewheels which churn the water, thus repelling the spilled material away from the device and toward a central region. By this arrangement, the device itself never becomes contaminated by the spilled material and is sprayed with the churning water, and therefore, should a fire break out, damage to the device is unlikely.

36 Claims, 9 Drawing Sheets

ROTATING CONTAINMENT AND REPELLING BOOM AND METHOD FOR CONFINING A MATERIAL FLOATABLE ON A LIQUID SURFACE

BACKGROUND OF THE INVENTION

1. Field of the Invention

The present invention pertains to oil containment booms in general and, more particularly, to a floating boom used in a marine environment which rotates so as to contain the oil within the confines of the boom while repelling the oil, thereby avoiding physical contact with such oil.

2. General Background

There currently exist many different types of booms used to contain oil or other contaminants which float on the surface of a body of water. These booms prevent such oil and/or contaminant from spreading elsewhere as well as aid in the recovery thereof.

U.S. Pat. No. 5,346,329 issued to Goans, et al., is but one example of such a boom. It operates on the principal of providing a continuous physical barrier between the floating oil and any uncontaminated water. As can be imagined, this boom floats on the water with a portion of it extending below the waterline while the remaining portion extends above the waterline. In this fashion, a continuous barrier around the spill area is provided. This type of boom is usually towed or installed by vessels in the periphery of the spill area, these vessels can also employ the boom to move the spilled oil out of an area if need be. Normally, this type of boom will be in physical contact with the oil such that should a fire erupt in the spill area, fire damage to the boom is likely, thereby causing a break in the continuous barrier surrounding the spill.

U.S. Pat. No. 5,374,133 issued to Lazes, et al., discloses another version of a floating boom used to provide a continuous barrier around a spill area. However, in this case, the boom also incorporates a high temperature resistant protective cover which is placed around the portion of the boom that extends just below and above the waterline. In this fashion, should a fire break out in the spill area, the boom will not be compromised since the boom is protected from such fire by the cover. However, even with this improvement, this boom is still in physical contact with the oil such that it becomes saturated with the material it is containing. Thus, once the oil is recovered, the boom itself must be cleaned-up for future re-use or the boom is disposed of in an environmentally safe manner. If the boom is wiped-down and cleaned, which is very labor intensive, the residue material from such action must itself be disposed of. Alternatively, if the boom is discarded, it must be done in a manner that will not further affect the environment which is itself quite expensive. In any event, one ends up with a boom that presents problems of its own.

U.S. Pat. No. 4,432,874 issued to Lundin discloses another variation of the floating type oil boom. This version differs from the above described oil booms in that it contains bristles (6) that are rotated to collect the oil. Thus, this type of boom can be said to be an active collector as compared with the above-discussed passive collector types. As best shown in FIGS. 1 and 2, this boom consists of a chain (9) that passes through the center of a plurality of individual floats (5). Each of these individual floats are rotated by the chain and yet they can also remain stationary while the chain rotates therethrough if need be. Thus, during operation, should a float engage a rock or other impedance in the water, it will stop rotating without affecting the continued rotation of adjacent floats. Secured to the outer periphery of each float are oil-collecting bristles (6) with additional bristles also being positioned between the individual floats. In this fashion, as the individual floats are rotated, the bristles engage and collect the spilled material. While this version would seem to overcome the problem arising whenever a portion thereof engages a rock or the like, such a boom is still in physical contact with the oil thus necessitating its cleaning after the spilled oil is recovered. Also, as a result of such physical contact with the oil and by its rotation, this boom can actually assist in lifting oil over the boom into unprotected waters. Thus, while the boom is containing the oil it may also disperse the oil outside the contained area. Thus, such a boom is perhaps most useful only in shallow areas where the bristles can be used to scour rocks and the like. Also, due to the frequent breaks between the individual floats, should this boom be employed passively, i.e. not be rotated, oil will then be allowed to escape through these breaks. Consequently, every time the rotation of such a boom is stopped, such as for breaks or re-positioning, the oil that was previously contained is now allowed to leak out. Furthermore, should a fire break out on the spilled oil, the boom is likely to be fire damaged. The apparatus of the present invention, as will be discussed herein, repels spilled oil as compared to the collection function of Lundin '874.

It is thus an object of this invention to provide a boom that overcomes the problems associated with the booms described above.

Another object of this invention is to provide a boom that can be passively employed by forming a continuous barrier, but preferably is actively employed by causing its components to rotate about a central chain, rope or the like.

A further object of this invention is to provide a boom that does not come into contact with the spilled oil by repelling it, thereby eliminating any and all clean-up problems.

Yet another object of this invention is to provide a boom having paddlewheels with paddles that lift water and drive it onto the entire paddlewheel to cool the same, so that the effects of a burning oil slick are minimized.

Yet another object of this invention is to provide a boom that distances itself from the spilled oil by repelling it so that should a fire erupt (or be intentionally set to dispose of spilled oil), damage to the boom is unlikely to occur, thereby allowing the boom to continuously contain the oil within the confines of the boom.

It is still another object of this invention to provide a boom that is light-weight and constructed of readily available materials.

Still another object of this invention is to provide a boom that can be repaired relatively easily should damage occur. These and other objects and advantages will become obvious upon further investigation.

SUMMARY OF THE PRESENT INVENTION

The preferred embodiment of the apparatus of the present invention solves the aforementioned problems in a straightforward and simple manner. This invention pertains to a device for the non-contact confinement or repelling of a material floatable on a liquid surface. It consists of a plurality of serially arranged paddlewheels with each such paddlewheel incorporating a plurality of paddle blades extending generally parallel to and spaced from a central axis. These paddle blades are supported in place along this central axis and a floatation assembly is located intermediate these paddle blades and the central axis for buoyancy purposes. A cable or rods connected by flexible joints extend concentric with this central axis and passes through each of the paddlewheels which are then secured to the cable via a connecting assembly. This cable or rods are rotated about their axis by a rotation assembly such that upon the rotation of the cable or rods, the paddlewheels are rotated about the central axis.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
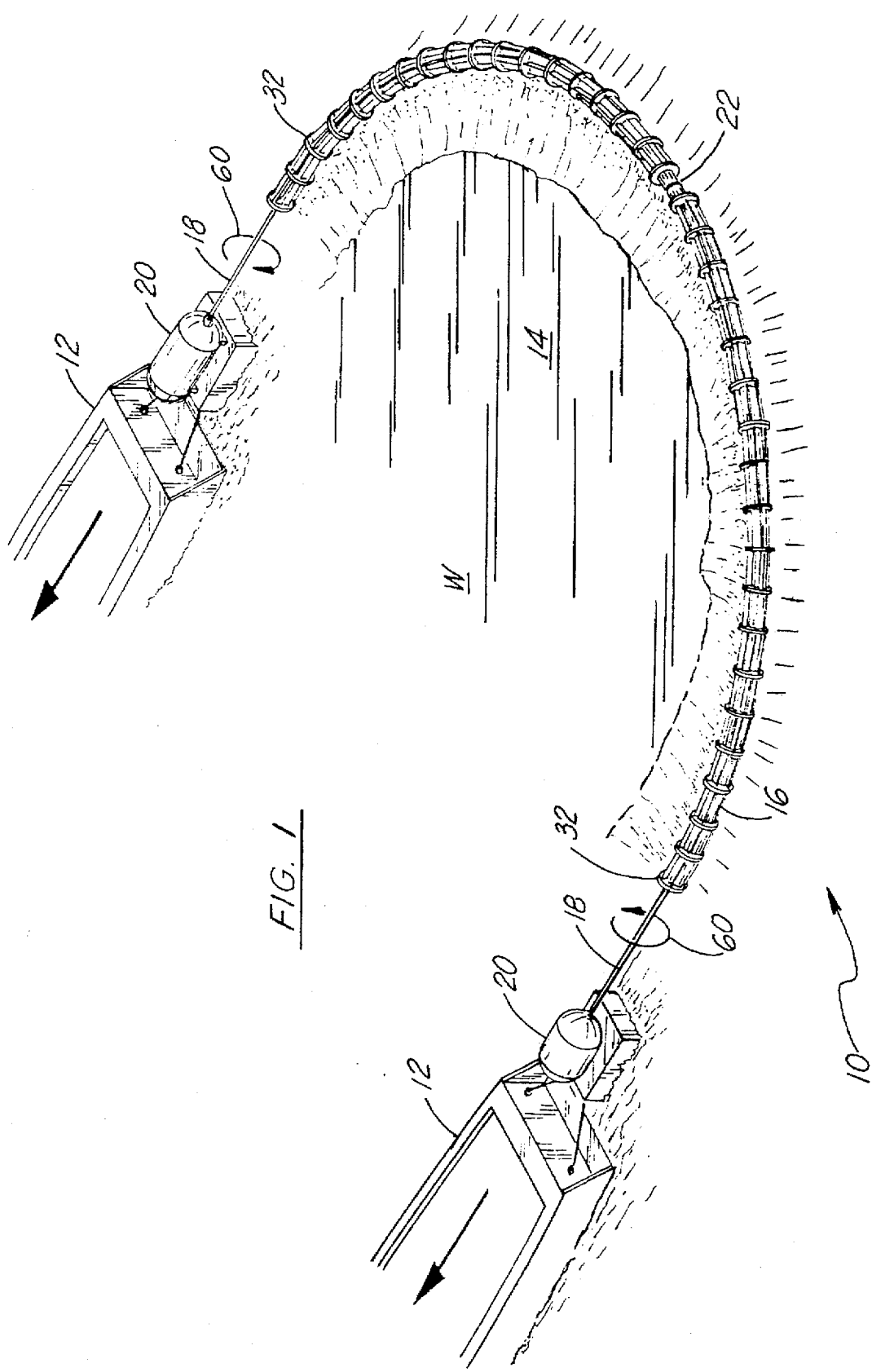
FIG. 1 is a pictorial view of the operation of the invention illustrating that a number of individual paddlewheels are axially arranged and rotated.

Referring initially to FIG. 1, there is shown boom 10 being towed by a pair of vessels 12. This boom 10 is used to capture and contain oil or another contaminant 14 floating on the surface of the body of water W so as to prevent it from spreading. Boom 10 consists of a plurality of individual paddlewheels 16 that are axially or serially arranged along cable (or rods connected by universal joints which are one equivalent) 18 secured between vessels 12. As best shown in FIG. 1, this cable 18 is rotated by motors 20 that are either secured to the stern of vessels 12 or are towed immediately behind them as illustrated. It was found by experimental testing that a slip joint 22, such as a ball-type joint, is useful generally half-way along cable 18 so that the separate halves of cable 18 can each be rotated by their respective motor 20.

Figure 2:
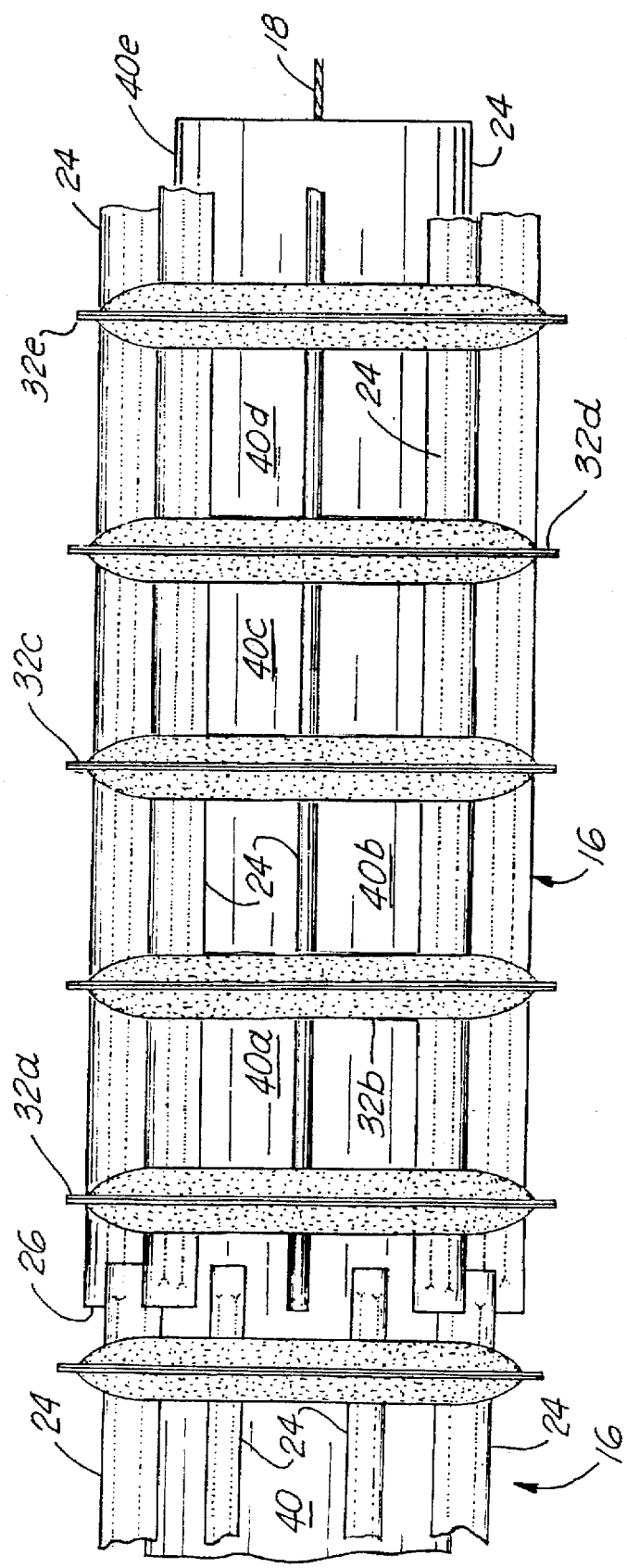
FIG. 2 is a front (or rear) view of portions of two adjacent paddlewheels illustrating the overlapping or interspacing of the paddles of such adjacent paddlewheels.
Figure 2A:
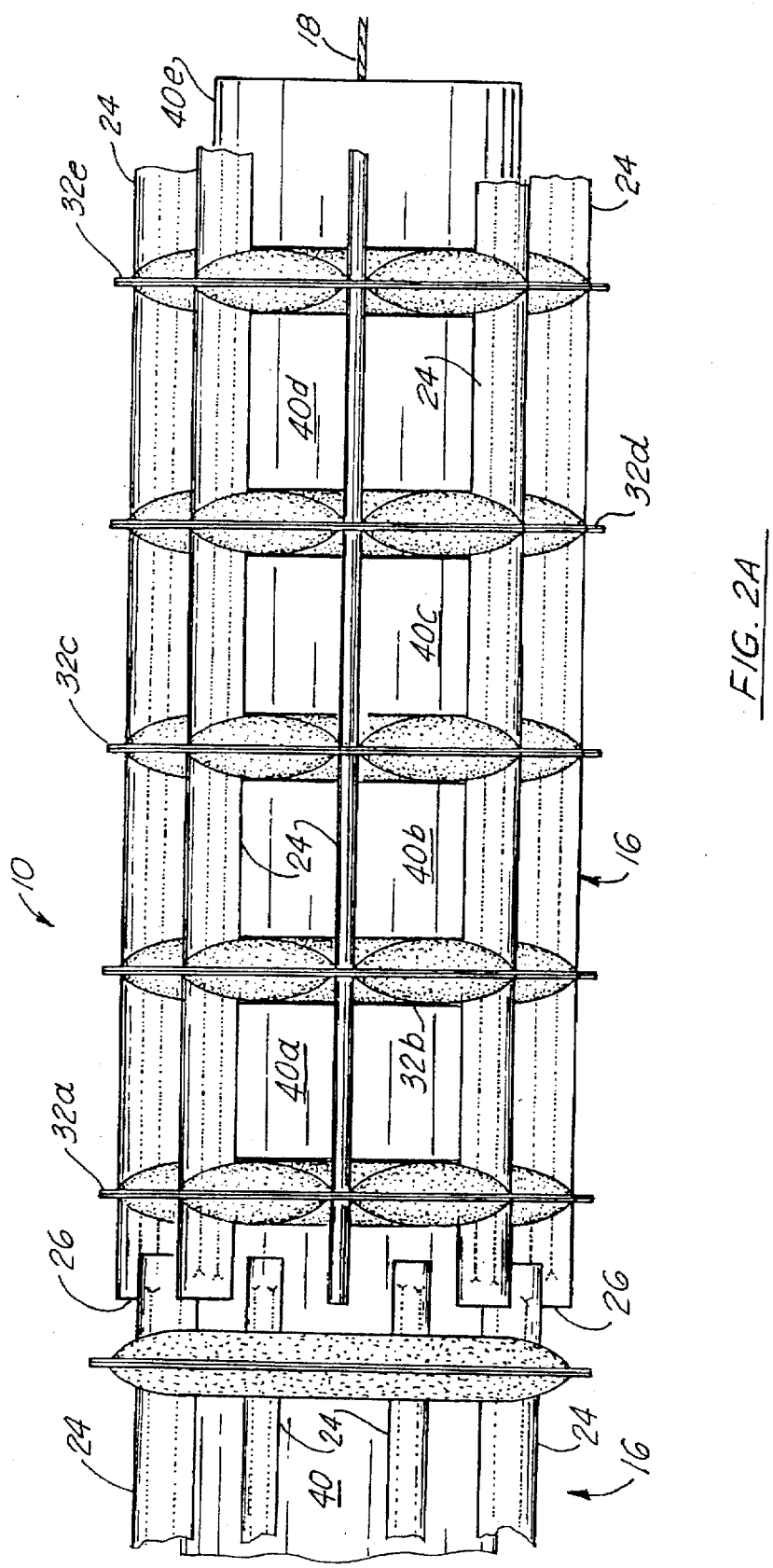
FIGS. 2A is the view of FIG. 2, with one of the two adjacent paddlewheels in cross-section.

Referring now to FIGS. 2 and 2A, there is shown more detail of a typical paddlewheel 16. Of course, the actual construction of paddlewheel 16 may vary, the method disclosed herein merely being one method of such construction illustrating how its major components interrelate. As shown, each paddlewheel 16 consists of a series of paddles or blades 24 spaced axially along the perimeter of paddlewheel 16 in the conventional fashion. While the actual number of paddles 24 employed in each paddlewheel 16 can vary, in this embodiment, each paddlewheel 16 employs eight (8) such paddles 24 in a circle about its outer periphery.

As shown in FIGS. 2 and 2A, the ends of the various paddles 24 of one paddlewheel 16 are offset and interspaced or staggered with respect to the ends of paddles 24 of adjacent paddlewheels 16. In this fashion, the interlocking or meshing (such as in gear teeth) joint 26 between adjacent paddlewheels 16 is capable of accommodating the curvature between adjacent paddlewheels 16 due to the curvature of boom 10. Furthermore, each paddlewheel 16 may itself be curved along its length as needed while still enabling boom 10 to function. Thus, by this joint 26 and the flexibility of paddles 24, boom 10 can function as a continuous barrier even when curved or non-linear.

Figure 3:
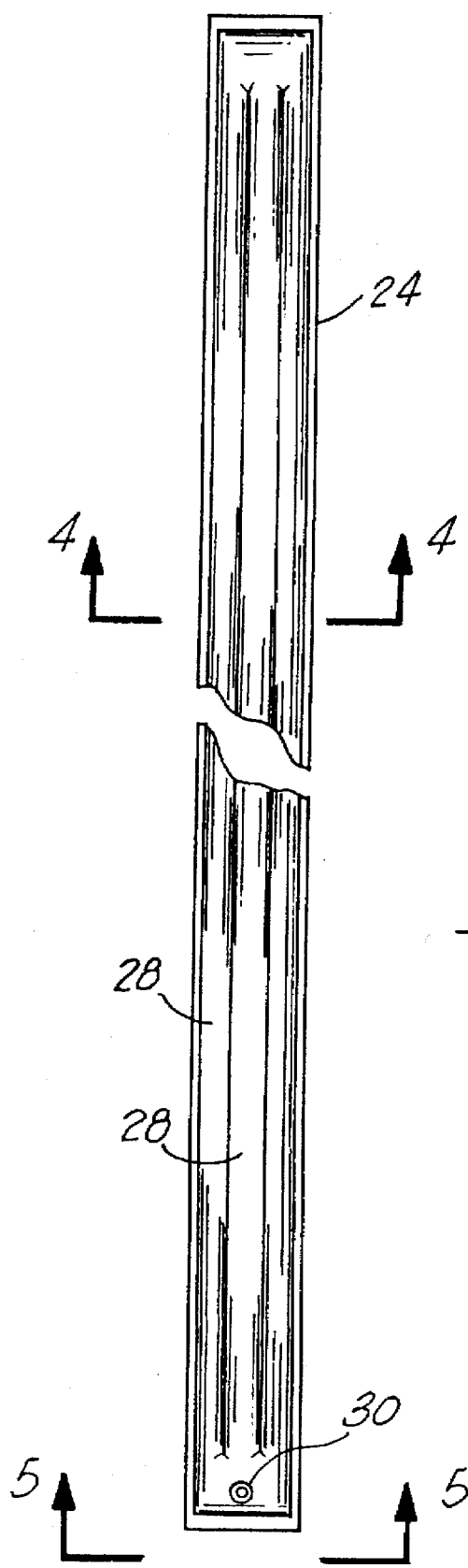
FIG. 3 is a pictorial view, partially cut away, of a paddle blade.
Figure 4:
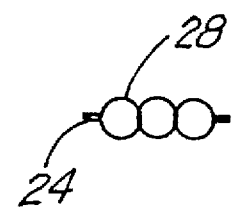
FIG. 4 is a sectional view taken along Lines 4—4 of FIG. 3 illustrating the air chambers within the paddle blade of the inflatable embodiment of this invention.
Figure 5:
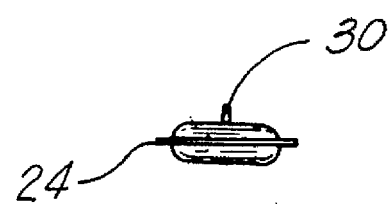
FIG. 5 is a sectional view taken along Lines 5—5 of FIG. 3 illustrating the end region of the paddle blade.
Figure 6:
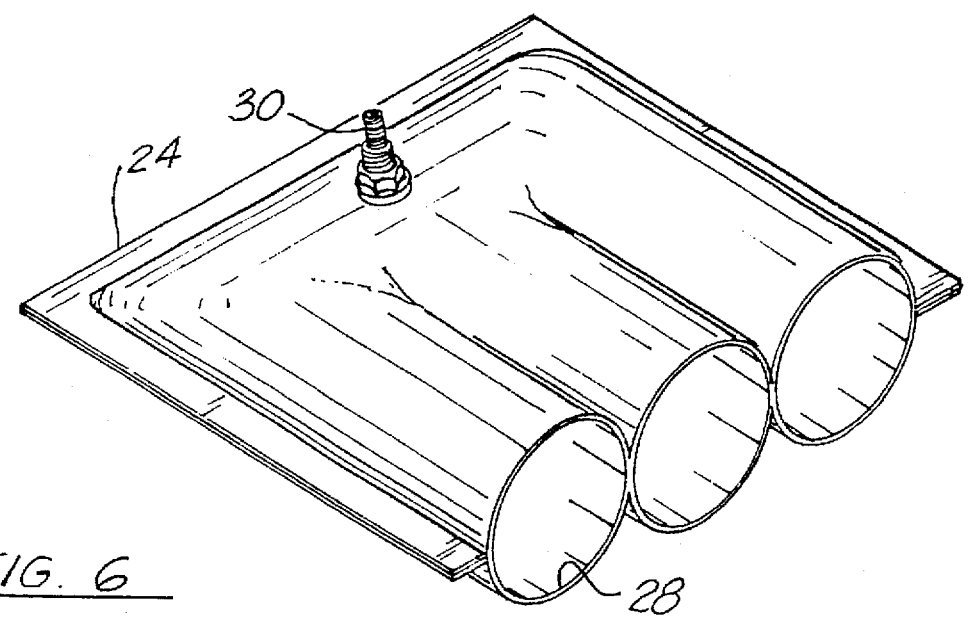
FIG. 6 is an enlarged pictorial view of the end region of the inflatable paddle blade.

FIGS. 3–6 disclose one construction of paddles 24. In this embodiment, paddle 24 is inflatable and about 10 feet long with one or more air chambers 28 therein. The actual configuration of paddles 24 may, of course, vary. The outer perimeter of each paddle 24 is sealed to prevent air escape. Also, a valve 30 is employed to allow access to these chambers 28. In this fashion, even after inflation, paddles 24 remain flexible so as not to break or tear should they encounter an obstacle. Air chambers 28 also aid in the flotation of paddlewheel 16. Ideally, paddles 24 would be constructed of a rubber-coated nylon or urethane-coated polyester for durability, flexibility, and air sealing qualities. Furthermore, the air chambers 28 within paddle 24 may all be interconnected, as shown in FIGS. 3 and 6, or they may consist of separate chambers 28 each having its own valve 30. This latter design, while more expensive, would provide protection should a tear occur in paddle 24.

Figure 7:
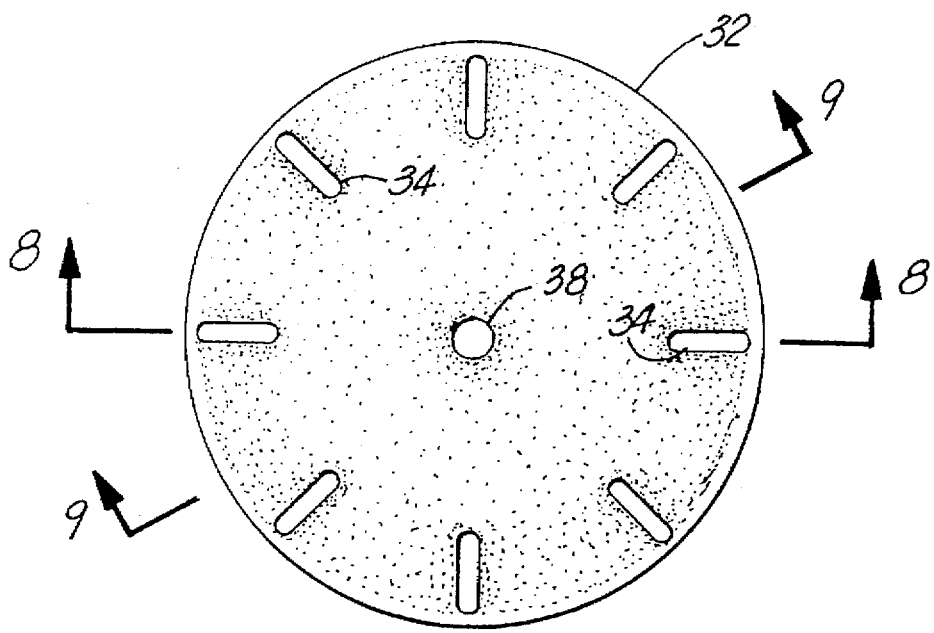
FIG. 7 is a pictorial view of an inflatable disc support used to brace the paddle blades about the perimeter of the paddlewheel.
Figure 8:
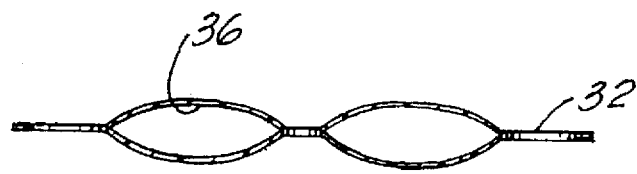
FIG. 8 is a cross-sectional view taken along Lines 8—8 of FIG. 7 illustrating an air chamber within the disc support.
Figure 9:
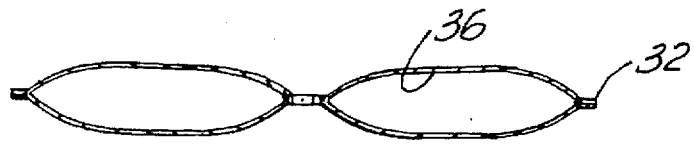
FIG. 9 is a cross-sectional view taken along Lines 9—9 of FIG. 7 illustrating the air chamber within the disc support.

Referring now to FIGS. 7-9, there is shown the configuration of a disc support 32 which is generally spaced about every two feet, more or less, along the length of paddlewheel 16. These disc supports 28 provide stability to paddles 24 and help prevent their buckling when they are rotated in the normal fashion. As shown in FIG. 2 and further in FIGS. 10, 11 and 15, paddles 24 pass through openings 34 that are located adjacent the outer periphery of each disc support 32. In this fashion, a paddle 24 passes through and is surrounded by an openings 34 about every two feet. Thus paddles 24 are both captured and braced by disc support 32. These disc supports 32 maintain the spacing of paddles 24 as well as their orientation parallel to the longitudinal axis of paddlewheel 16.

Disc support 32 is, as best shown in FIGS. 8 and 9, preferably configured with a plurality of air chambers 36 therein to aid in the buoyancy of paddlewheel 16. These air chambers 36 can be of many different configurations and are inflated in the conventional fashion via a valve (not shown) similar to valve 30. FIG. 7 discloses a typical disc support 32 that is secured along cable 18 which passes through central opening 38. Generally disc support 32 is constructed of the same material as paddles 24 such as rubber-coated nylon or fabric or urethane-coated polyester. Air chambers 36 are arranged so as to provide support and rigidity to disc support 32, but disc supports 32 and paddles 24 are also capable of flexing when needed, such as when encountering an obstacle. Alternatively, disc supports 32 and paddles 24 can be constructed of a solid material, a foam, or a thin plate if need be.

Figure 10:
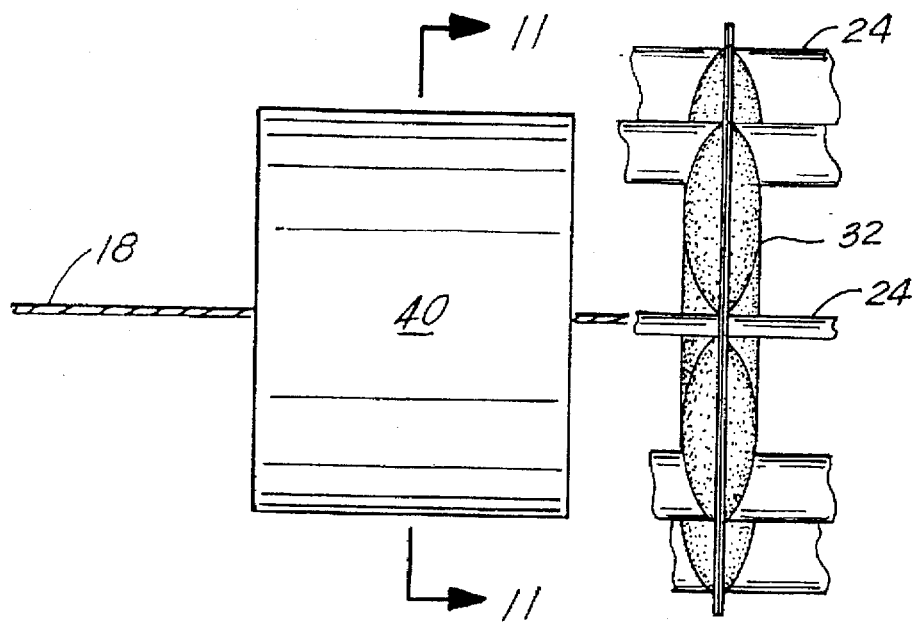
FIG. 10 is a pictorial view of the (optional) inner float around which the paddle blades are secured.
Figure 11:
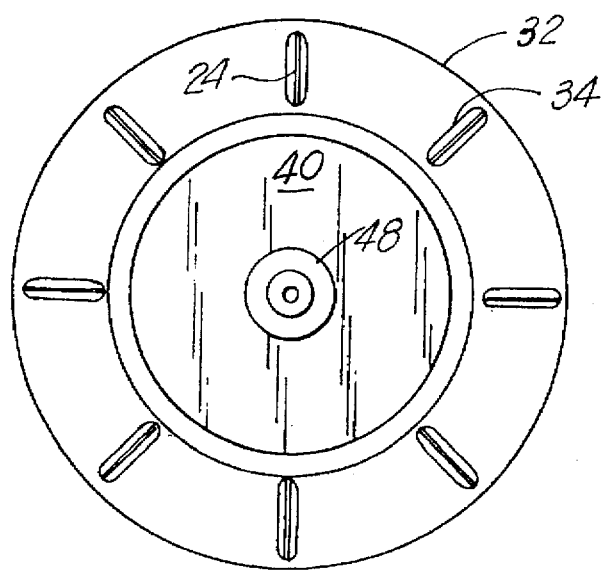
FIG. 11 is a sectional view of the inner float taken along Lines 11—11 of FIG. 10.

FIGS. 10 and 11 disclose additional floatation that can be provided paddlewheels 16. This additional floatation is in the form of floats 40 through which cable 18 passes. Floats 40 are positioned intermediate disc supports 32 and are generally about two feet long (more or less). Thus, in this embodiment, for each ten foot length of paddles 24 (FIG. 2), there would be five floats 40a–40e sandwiched between six disc supports 32a–32f (32a–32e shown, 32f not shown but adjacent 32d). Floats 40 may be comprised of foam such as styrofoam or of any other material whose density is less than that of water. It may also consist of a sealed inflatable chamber which is capable of floating on the surface of the water. The outer diameter of floats 40 are sized to fit within the area between cable 18 and paddles 24 as best shown in FIG. 11. Generally, however, the outer diameter of floats 40 are sized to just engage or be slightly recessed from the inner edge of paddles 24, thereby also providing rigidity to such paddles 24. However, floats 40 can also be sized to be considerably smaller than the inner edge of paddles 24 so as not to interfere with their rotation about floats 40 (which may or may not be rotated as chain 18 is rotated).

Figure 12:
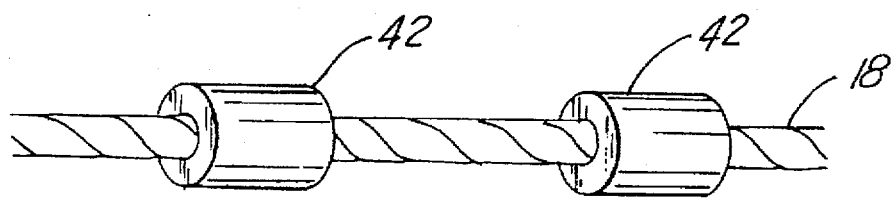
FIG. 12 is a pictorial view, partially cut away, of the cable used to rotate the paddlewheel and the fittings secured thereto for attaching the paddlewheels to the cable.
Figure 13:
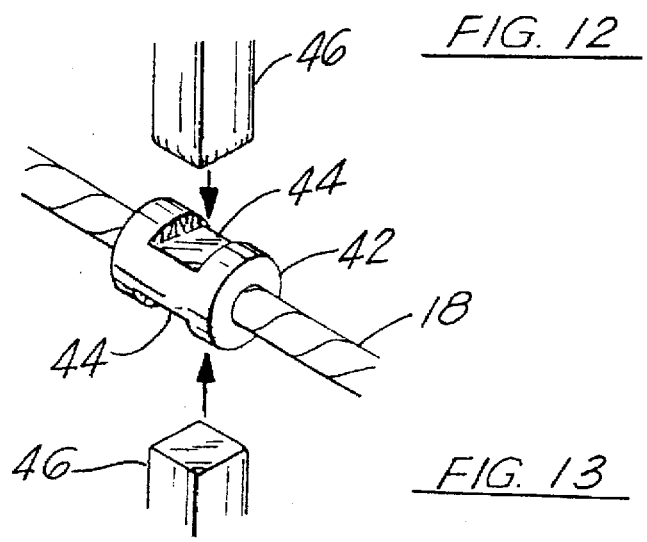
FIG. 13 is a pictorial view, partially cut away, of one manner of securing a paddlewheel to the cable.
Figure 14:
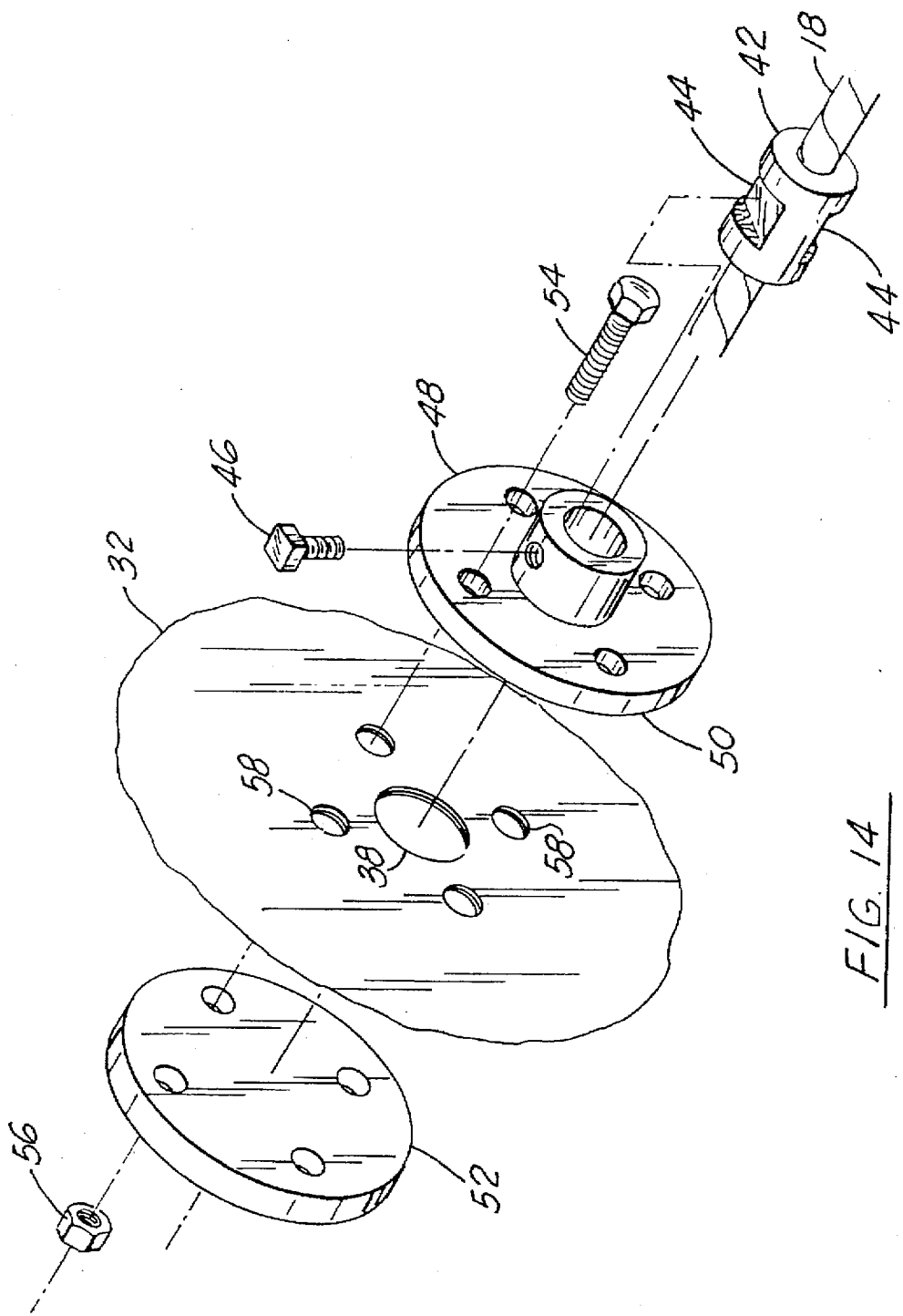
FIG. 14 is an exploded pictorial view of the various components employed to secure the paddlewheel to the cable; and, FIG. 15 is a pictorial view of the operation of the paddlewheel.

Referring now to FIGS. 12–14, there is shown one method of securing disc supports 32 to cable 18. Of course, cable 18 can be a wire cable, a chain, a rope or a series of solid rods connected with universal joints (actually the preferred arrangement through recent experimental testing) or any other equivalent to which paddlewheels 16 can be secured. In the embodiment of FIGS. 11–14, fittings 42 are fixedly secured to cable 18 about every two feet, more or less, so as to mark the locations where a disc support 32 is to be secured to cable 18. These fittings 42 generally contain at least one (but usually two) recessed area or key 44 into which a bolt 46 extends and engages. First, however, this bolt 46 is threaded into collar 48 in the normal fashion. Collar 48 is configured with a flat surface 50 which abuts the central region of a disc support 32. A retaining plate 52 is positioned on the opposite side of disc support 32 as shown and the two (collar 48 and retaining plate 52) are secured together such as by bolts 54 and nuts 56. Of course, cable 18 passes through the center of collar 48 and retaining plate 52. Additionally, disc support 32 is configured with bolt openings 58 for the passage of bolts 54 therethrough without interfering with air chamber 36.

Once disc support 32 is properly wedged or compressed between collar 48 and retaining plate 52, collar is fastened to cable 18 via bolt 46 (and possibly two of them), each on opposite sides of fitting 42. Thus, as cable 18 rotates, so does disc support 32. Obviously, should the need arise, bolt 46 can be unthreaded so that its disc support 32 can be removed and/or replaced. To remove a paddlewheel 16 from cable 18, it is only necessary to remove each of the bolts 46 securing the paddlewheel 16 to cable 18. Because of this manner of securement, all of the paddlewheels 16 rotate together as cable 18 is rotated by motors 20. Consequently, as disc supports 32 rotate, so do paddles 24. Float 40 may also rotate along with cable 18, but if slippage occurs between the two, float 40 may no longer rotate. The non-rotation of float 40 will not interfere with the rotation of paddles 24 due to the space between paddles 24 and float 40. There is also a slight space between each disc support 32 and float 40 due to the thicknesses of both collar 48 and retaining plate 52.

As can be understood, each paddlewheel 16 extends the length of its respective paddles 24. Thus, should paddles 24 have a length of ten feet or so, then paddlewheel 16 would incorporate about six disc supports 32 and five floats 40. However, if desired, a paddlewheel 16 could be only as long as about two feet, thereby incorporating only two such disc supports 32 and only one float 40 therebetween. The actual length and configuration of paddlewheel 16 may vary such as by altering the length of paddles 24 or by varying the spacing of disc supports 32 and/or floats 40 along paddles 24.

Figure 15:
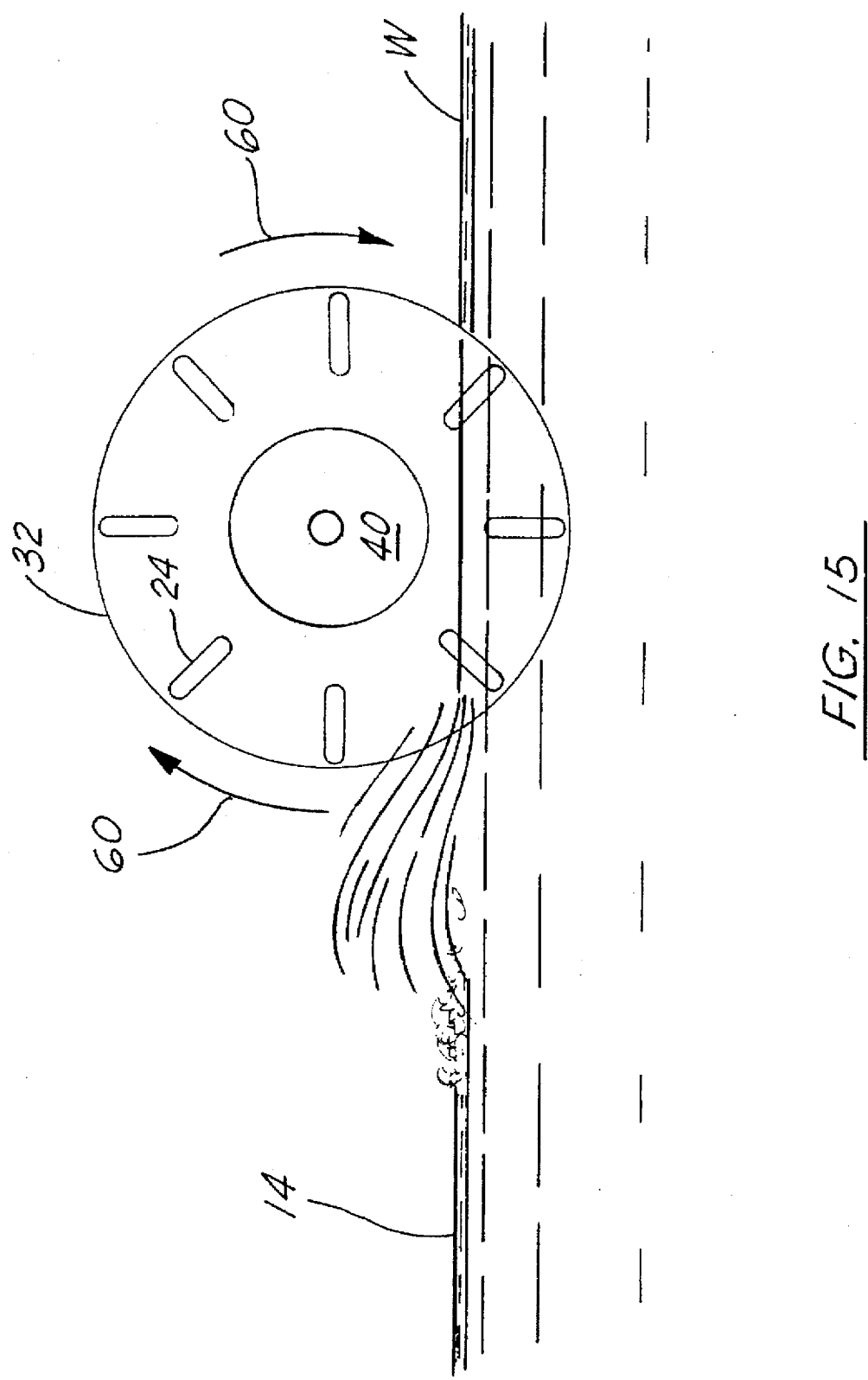

Referring now to FIG. 15, there is shown the operation of paddlewheels 16. As motors 20 rotate cable 18, it in turn rotates fittings 42 which, because they are now fastened to collar 48 via bolts 46, causes disc supports 32 to rotate. The rotation of disc supports 32, in turn, causes paddles 24 to rotate, thereby completing the rotation of paddlewheels 16. Each of the various paddlewheels 16 rotate in unison due to their securement to fittings 42 spaced along cable 18. As stated earlier, floats 40 may or may not also rotate along with paddles 24, it depends on how they are secured to cable 18. However, the relatively short length of each float 40 with respect to the length of boom 10 enables boom 10 to bend and flex as needed in order to retain oil 14 within boom 10. Such flexing of boom 10 is possible due to the flexibility of paddles 24, disc supports 32 and cable 18 which bend as needed to accommodate the curvature of boom 10 without interfering with its operation.

As shown in FIGS. 1 and 15, paddlewheels 16 are rotated in the (clockwise or outwardly) direction of ARROWS 60 to constantly push or repel water W and, therefore, oil 14 on the surface of water W away from boom 10 (repelling is only accomplished by rotation in this direction). This is accomplished by rotating the paddlewheels 16 of boom 10, thereby churning up the water W and pushing such water W against the oil 14. This ability to contain oil 14 while avoiding direct contact with it not only keeps boom 10 and its paddlewheels 16 clean, but it also provides some distance between boom 10 and oil 14 in the case of fire. Further, there is a cooling and fire-prevention effect created by the water being driven over and, thereby, sprayed on the paddlewheels 16 by paddles 24. By continuing to push oil 14 to the middle of the slick, the oil 14 becomes more concentrated, thereby making it easier to collect or burn. The construction of paddlewheel 16 of material that is buoyant enables paddlewheel 16 to literally float on the surface of the water, thereby making it easier to move about. Furthermore, by utilizing flexible material for the construction of paddlewheels 16, should an obstacle be encountered, it is unlikely that any damage will result. Also, as stated above, slip joint 22 is provided along the length of boom 10, normally at the mid-point, so that should one motor 20 rotate at a different speed than the other motor 20, no damage cable 18 or paddlewheels 16 will occur.

Due to the relative ease at which paddlewheels 16 can be added to or removed from cable 18, the length of boom 10 can vary as needed. Also, should damage to one paddlewheel 16 or paddle 24 occur, it can easily be replaced without affecting the operation of boom 10. An added feature of boom 10 is its ability to continue to contain oil 14 even in the event paddlewheels 16 are not rotating. This is due to the meshing or interspacial arrangement of the various paddles 24 at joint 26 between adjacent paddlewheels 16. This intermeshing arrangement of the individual paddles 24 and also floats 40 and disc supports 32 provide the equivalent of a continuous barrier, thereby maintaining the ability of boom 10 to contain oil 14 even when paddlewheels 16 are not rotating.

Further boom 10 can be employed to merely repel a contaminant from an environmentally sensitive area. For example, boom 10 even in a linear arrangement (instead of the curved arrangement of FIG. 1) can be positioned to repel an oil slick from a fish hatchery, municipal water intake, flammable materials, storage area, etc.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A device for the containment or repelling of a material floatable on a liquid surface comprising:
a plurality of serially connected rotatable paddlewheels, each said paddlewheel having a central axis and, comprising:
a plurality of elongated paddle blades extending around said central axis, said paddle blades extending generally parallel to and spaced about said central axis; and,
means for supporting said paddle blades about said central axis; and,
means for providing buoyancy to said paddlewheels.

2. The device as set forth in claim 1, further comprising drive means extending concentrically with said central axis and passing through and connected to each of said paddlewheels for providing rotational movement to said paddlewheels, whereby said material is repelled from said paddlewheels.

3. The device as set forth in claim 1, wherein each said paddle blade is elongated and flexible along its length so as to accommodate any curvature in said serially connected paddlewheels.

4. The device as set forth in claim 1, wherein said paddle blades have opposing ends and one end of said blades of one said paddlewheel overlap one of the ends of said paddle blades of an adjacent paddlewheel, thereby forming with said serially connected paddlewheels a continuous barrier along the length of said serially connected paddlewheels.

5. The device as set forth in claim 1, wherein said buoyancy means comprises said paddle blades.

6. The device as set forth in claim 1, wherein said blade supporting means comprises a plurality of spaced-apart disc members having radially extending and spaced-apart openings therein through which said paddle blades extend.

7. The device as set forth in claim 6, wherein said buoyancy means comprises said disc members.

8. The device as set forth in claim 5, wherein said buoyancy means further comprises a foam or inflatable cylindrical member through which a shaft centrally passes, said cylindrical member being rotated by said shaft and extending outwardly from said shaft towards said paddle blades.

9. A device for the containment or repelling of a material floatable on a liquid surface comprising:
a plurality of serially connected rotatable paddlewheels, each said paddlewheel having a central axis and, comprising:
a plurality of elongated paddle blades extending around said central axis; and,
means for supporting said paddle blades about said central axis;
means for providing buoyancy to said paddlewheels; and,
drive means extending concentrically with said central axis and passing through and connected to each of said paddlewheels for providing rotational movement to said paddlewheels, whereby said material is repelled from said paddlewheels.

10. The device as set forth in claim 9, wherein said blade supporting means is fixedly mounted to said drive means.

11. The device as set forth in claim 10, wherein said drive means includes an elongated shaft having spaced fittings attached thereto for securing said blade supporting means thereto.

12. The device as set forth in claim 11, further comprising a joint positioned along the length of said shaft for independent rotation of said shaft on either side of said joint.

13. The device as set forth in claim 11, wherein said drive means further includes a plurality of motors provided by separate vessels, said shaft having opposing ends which are secured to and rotated by at least one of said motors provided by each of said vessels.

14. The device as set forth in claim 9, wherein each said paddle blade is elongated and flexible along its length so as to accommodate any curvature in said serially connected paddlewheels.

15. The device as set forth in claim 9, wherein the ends of said paddle blades of one said paddlewheel overlap the ends of said paddle blades of an adjacent paddlewheel, thereby forming with said serially connected paddlewheels a continuous barrier along the length of said serially connected paddlewheels.

16. The device as set forth in claim 9, wherein said buoyancy means comprises said paddle blades.

17. The device as set forth in claim 16, wherein said buoyancy means further comprises a foam or inflatable cylindrical member through which a said shaft centrally passes, said cylindrical member being rotated by said shaft and extending outwardly from said shaft towards said paddle blades.

18. The device as set forth in claim 9, wherein said blade supporting means comprises a plurality of spaced-apart disc members having radially extending and spaced-apart openings therein through which said paddle blades extend.

19. The device as set forth in claim 18, wherein said buoyancy means comprises said disc members.

20. A containment device for the non-contact confinement or repelling of a material floatable on a liquid surface comprising:
a plurality of serially connected paddlewheels, each said paddlewheel having a central axis and comprising:
a plurality of elongated paddle blades extending around said central axis; and,
means for supporting said paddle blades about said central axis;
means for providing buoyancy to said paddlewheels; and,
drive means extending concentrically with said central axis and passing through and connected to said support means of each of said paddlewheels for providing rotational movement to said paddlewheels, whereby said material is repelled from said paddlewheels.

21. The device as set forth in claim 20, wherein said paddle blades extend generally parallel to and spaced about said central axis.

22. The device as set forth in claim 20, wherein each said paddle blade is flexible along its length so as to accommodate any curvature in said serially connected paddlewheels.

23. The device as set forth in claim 20, wherein said paddle blades have opposing ends and one end of said blades of one said paddlewheel overlap one of the ends of said paddle blades of an adjacent paddlewheel, thereby forming with said serially connected paddlewheels a continuous barrier along the length of said serially connected paddlewheels.

24. The device as set forth in claim 20, wherein said buoyancy means comprises each of said paddle blades.

25. The device as set forth in claim 24, wherein said buoyancy means further comprises a foam or inflatable cylindrical member through which a shaft centrally passes, said cylindrical member being rotated by said shaft and extending outwardly from said shaft to said paddle blades.

26. The device as set forth in claim 20, wherein said blade supporting means comprises a plurality of spaced-apart disc members having radially extending and spaced-apart openings therein through which said paddle blades transversely extend.

27. The device as set forth in claim 26, wherein said disc members are inflatable.

28. The device as set forth in claim 20, wherein said drive means includes an elongated shaft having spaced fittings attached thereto for securing said blade supporting means thereto.

29. A non-contact method of confining a material floatable on a liquid surface by a floating containment boom comprising the steps of:

surrounding said material with a plurality of serially connected paddlewheels, each said paddlewheel comprising:
a plurality of elongated paddle blades extending generally parallel to and spaced-apart from a central axis; and,
means for supporting said paddle blades about said central axis;
extending a shaft concentrically with said central axis and passing said shaft through each said paddlewheel;
securing each said paddlewheel to said shaft; and,
rotating said shaft about said central axis, whereby upon the rotation of said shaft, said paddlewheels are rotated about said central axis to force said liquid surface to repel said material from said boom.

30. The method as set forth in claim 29, wherein said paddle blades are formed of an elongated flexible material so as to accommodate any curvature in said boom.

31. The method as set forth in claim 30, further comprising the step of overlapping the ends of said paddle blades of one said paddlewheel with the ends of said paddle blades of an adjacent said paddlewheel thereby forming with said serially connected paddlewheels a continuous barrier along the length of the boom.

32. The method as set forth in claim 30, wherein said paddle blades include at least one inflatable air chamber therein.

33. The method as set forth in claim 30, wherein said blade supporting means comprise a plurality of spaced-apart disc members having radially extending and spaced-apart openings therein through which said paddle blades extend.

34. The method as set forth in claim 33, wherein said disc members are inflatable or foam.

35. The method as set forth in claim 34, wherein said blade supporting means are fixedly mounted to said shaft.

36. The method as set forth in claim 33, further comprising the step of securing said disc members to said shaft, whereby upon the rotation of said shaft, said serially arranged paddlewheels rotate in unison.

* * * * *